United States Patent [19]

Shannon et al.

[11] Patent Number: 5,485,049
[45] Date of Patent: Jan. 16, 1996

[54] MULTI-SPEED MOTOR

[75] Inventors: Larry S. Shannon; David W. Welch; Daniel P. Bexten, all of Columbus, Miss.

[73] Assignee: United Technologies Motor Systems, Inc., Columbus, Miss.

[21] Appl. No.: 248,777

[22] Filed: May 25, 1994

[51] Int. Cl.$^6$ .................................................. H02K 13/00
[52] U.S. Cl. ................................................................ 310/248
[58] Field of Search ............................ 310/248–253, 310/220, 239; 318/DIG. 2, 380, 443

[56] References Cited

U.S. PATENT DOCUMENTS

| | | | |
|---|---|---|---|
| 672,449 | 4/1901 | Markey | 310/248 |
| 2,375,818 | 5/1945 | Peters | 310/248 |
| 3,355,611 | 11/1967 | Meyer et al. | 310/248 |
| 3,774,091 | 11/1973 | Kearns | 318/380 X |
| 4,694,214 | 9/1987 | Stewart, Sr. | 310/239 |
| 4,774,754 | 10/1988 | Stewart, Sr. | 29/596 |
| 5,006,747 | 4/1991 | Stewart, Sr. | 310/239 |

FOREIGN PATENT DOCUMENTS

| | | | |
|---|---|---|---|
| 1092630 | 5/1984 | U.S.S.R. | 310/248 |
| 1309104 | 3/1973 | United Kingdom | 310/248 |

*Primary Examiner*—Mark O. Budd
*Attorney, Agent, or Firm*—William W. Habelt

[57] ABSTRACT

A multi-speed, direct current motor (120) incorporates a high speed (24) brush disposed between the low speed (22) and the common ground (26) brushes and having a non-arcuate end face (25) which, unlike the conventional arcuate brush end face (23,27), is not subject to speed-drift erosion. The non-arcuate end face (25) is configured of two offset surfaces (55,65 & 57,67) which intersect to provide a line of contact (43) between the end face (25) of the high speed brush (24) and the commutator (40) which is displaced from the center line of the high speed brush (24) in a direction counter to the direction of rotation of the motor, that is toward the leading edge (21) of the brush (24). The intersecting surfaces (55,65 & 57,67) may comprise either flat planar surfaces or contoured surfaces.

32 Claims, 3 Drawing Sheets

5,485,049

MULTI-SPEED MOTOR

TECHNICAL FIELD

The present invention relates generally to direct current motors and, more particularly, to multi-speed direct current motors, such as for example two-speed direct current motors having a two pole, three brush configuration or a four pole, six brush configuration.

BACKGROUND ART

A common application for a two-speed direct current motor is as the drive motor for driving the windshield wipers of a motor vehicle at either a low speed or a high speed. Typically, the driver of the motor vehicle positions a wiper switch at either a low speed setting or a high speed setting whereby electric power is directed through associated electronic circuitry to power the direct current motor. One type of commonly used two-speed direct current motor has three brushes, comprising a low speed brush, a high speed brush and a common ground brush, for supplying current to the windings on the armature of the motor. Each of the brushes contacts a commutator located on and rotating with the armature shaft. A pair of the brushes, generally the low speed brush and the common ground brush, are disposed in circumferentially spaced relationship substantially 180° apart. In operation of the motor, current is passed from a power source through the low speed brush to the commutator, thence through the motor windings and back to the power source through the common ground brush positioned substantially 180° circumferentially from the low speed brush.

When current is supplied to the low speed brush, the motor operates at a first lower rotational speed (lower RPM) and the wipers sweep at a lower speed, for example 45 cycles per minute. When it is desired to operate the motor at a second higher speed, current is instead supplied to the windings through the high speed brush which is positioned in circumferentially spaced relationship with and between the low speed and the common ground brushes. As is well understood by those skilled in the art, when the current is supplied to the motor through this third brush, which is circumferentially closer to the common ground brush than the low speed brush is, the rotational speed of the motor is increased to a second higher RPM (revolutions per minute) and the wipers sweep at a higher speed, for example 65 cycles per minute. The relative difference between the lower rotational speed and the higher rotational speed of the motor is determined by the offset, i.e. the angle of separation, of the high speed brush from the common ground brush.

An inherent problem experienced in operation of two-speed direct current motors arises from electrical wear, commonly termed erosion, of the end face of the high speed brush. This erosion is caused by the electrical arcing which occurs as contact between the brush end face and the commutator is broken. Due to the positioning of the high speed brush such that commutation with the armature windings occurs when the windings are passing outside of the neutral zone of the magnetic fields established by the field magnets of the motor, which may be formed by permanent magnet poles or wound electromagnet poles, the arcing is more severe than experienced at the low speed and common ground brushes which are positioned such that commutation with the armature windings takes place when the windings are passing within the neutral zone of the magnetic fields established by the field magnets.

The erosion of the end face of the high speed brush results in a shift of the effective contact line between the brush and the commutator as the high speed brush seats on the commutator during the early phase of its operational life, typically over the first couple hundred or so hours of operation of the motor. Thus, the effective contact line between the high speed brush and the commutator shifts towards the leading edge of the brush away from its initial position at the center of the brush, which is where the contact line was positioned when the motor was operated for specification testing prior to being placed into service. This shift in the effective line of contact adversely impacts motor performance as it results in an increase in the RPM of the motor at high speed operation beyond the desired RPM of the motor at high speed operation, causing the wipers to sweep at up to 75 to 80 cycles per minute rather than the desired 65 cycles per minute at the higher speed setting. For a worn-in motor, the actual high speed RPM may be well above the high RPM measured during specification testing and actually be outside of the acceptable range of specification speeds.

SUMMARY OF THE INVENTION

It is an object of the present invention to provide a multi-speed direct current motor which exhibits minimal high speed drift.

In accordance with the present invention, the end face of the high speed brush disposed between the low speed and the common ground brushes, has a non-arcuate end face which, unlike the conventional arcuate brush end face, is not subject to speed-drift erosion. The non-arcuate end face is configured of two offset surfaces which intersect to provide a line of contact between the end face of the high speed brush and the commutator which is displaced from the center line of the high speed brush by a preselected circumferential spacing in a direction counter to the direction of rotation of the motor, that is toward the leading edge of the brush. The intersecting surfaces may comprise either flat planar surfaces or contoured surfaces.

In accordance with one embodiment of the present invention, the end face of the high speed brush of a two pole, three brush, two speed direct current motor, which is located intermediate the diametrically opposed low speed brush and common ground brush, has a first surface and a second surface intersecting at a line of intersection forming the line of contact with the commutator of the motor when the intermediate brush is disposed in its operational position, the second surface being offset from the first surface at an acute angle, the magnitude of the angle of offset between the first and second surfaces varying according to the diameter upon which the brush rides. In a specific embodiment of the present invention comprising a fractional horsepower two-speed direct current motor particularly suited for use as a drive motor for an automobile windshield wiper system, the motor has a commutator having a diameter of approximately 0.860 inches, the first and second surfaces of the end face of the high speed brush comprise flat planar surfaces, and the first and second flat planar surfaces intersect at an offset angle ranging from 10 to 15 degrees, and optimally at an angle of about 13 degrees, and provide a line of contact which is located about 0.025 inches (about 0.635 millimeters) inwardly from the leading edge of the high speed brush, rather than being located at the mid-width line of the approximately 0.20 inch (about 5.15 millimeters) wide brush.

BRIEF DESCRIPTION OF THE DRAWINGS

The present invention will be described herein with reference to the drawing wherein.

DESCRIPTION OF A PREFERRED EMBODIMENT

The invention will be described herein as applied to small fractional-horsepower, two-speed direct current motors of the type commonly used as drive motors in automobile windshield wiper systems. It is to be understood, however, that the invention is generally applicable to other types of multi-speed dynamo electric devices which utilize brushes subjected to severe arcing in at least the early stages of operation.

Figure 1:
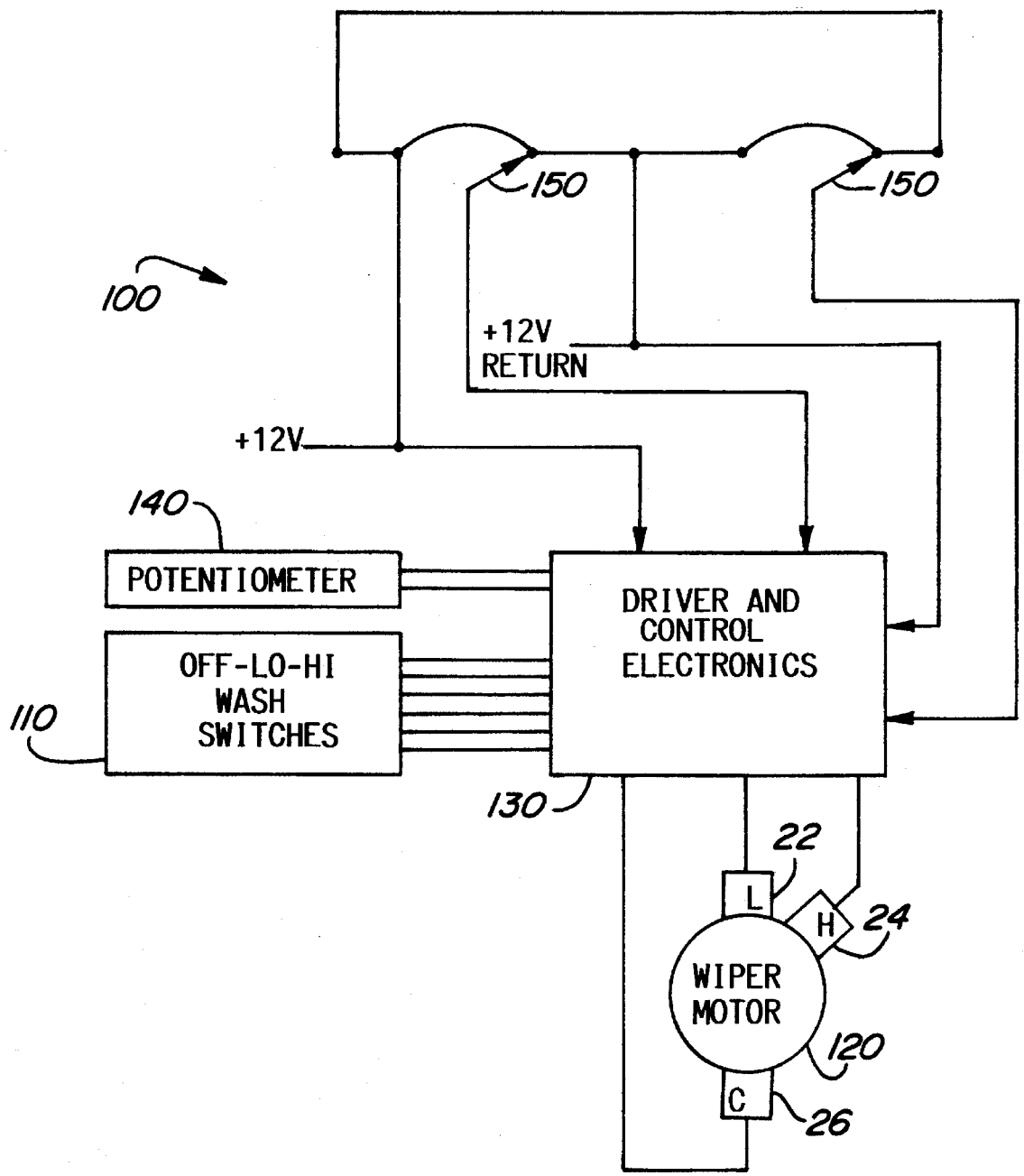
FIG. 1 is schematic illustration of a typical automobile windshield wiper system employing a two-speed direct current motor.

Referring now to FIG. 1, there is depicted, schematically, a relatively typical wiper system 100 for the windshield of an automotive vehicle. Generally, such a wiper system includes a wiper mode switch 110, typically a multifunctional switch or a plurality of ganged switches, a two-speed direct current motor 120 having a low speed brush 22, a high speed brush 24, and a common ground brush 26, an electronic driver and controller 130 operatively associated with the wiper mode switch 110 and the motor 120, a potentiometer 140 operatively associated with the driver and controller 130 for providing an adjustable delay for intermittent wiper operation, and a pair of wipers 150 operative to sweep the windshield of the vehicle and operatively linked to the motor 120 to be selectively driven by the motor 120 at either a relatively lower speed or a relatively higher speed in response to the setting of the wiper mode switch 110.

Figure 2:
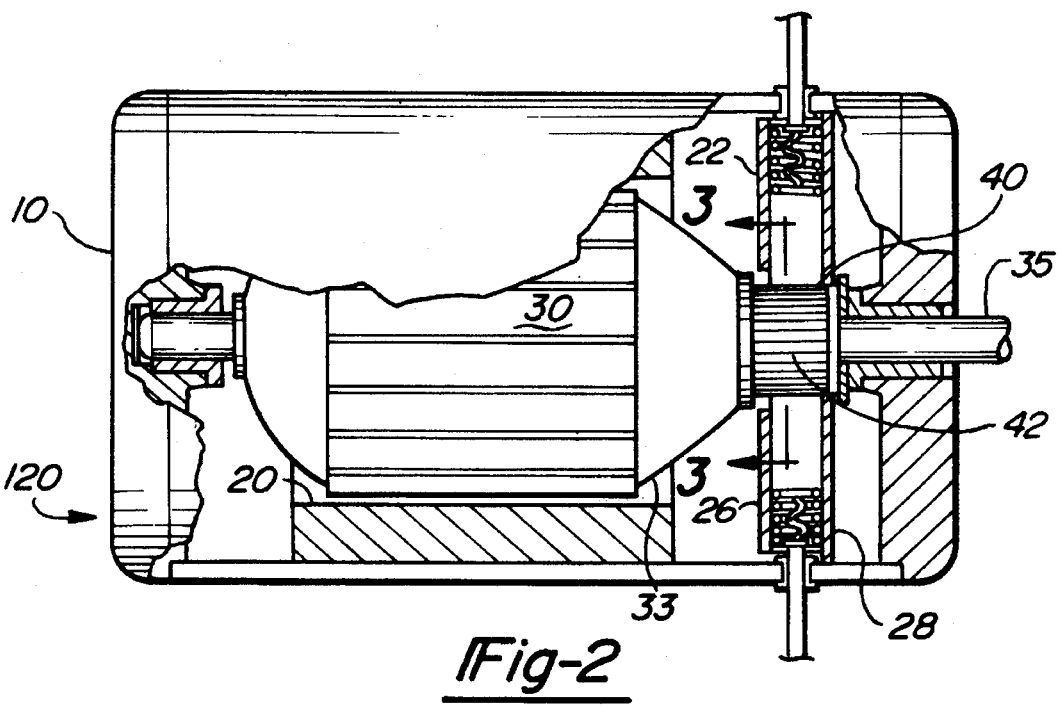
FIG. 2 is side elevational view, partly in section, of a two-speed direct current motor.
Figure 3:
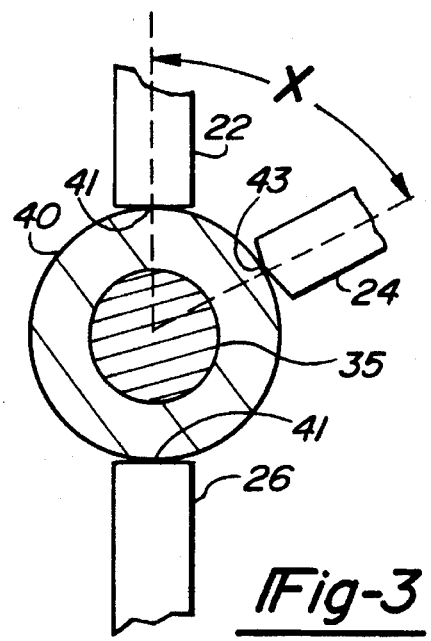
FIG. 3 is an enlarged sectional end view taken along line 3—3 of FIG. 2 showing the three brush configuration of the two-speed direct current motor.

A three brush, two-speed, two pole, fractional-horsepower direct current motor of the type commonly utilized in a typical automobile wiper system 100 as the drive motor 120 is depicted in FIG. 2. The drive motor 120 has a housing 10 having a pair of opposed elongated magnet poles 20 mounted therein, each of the magnet poles comprising permanent magnets typically being in the form of a section of a cylindrical shell, although the magnet poles could also comprise wound electromagnets, rather than permanent magnets. An armature 30 comprised of a plurality of wire windings 33 is supported on an axially elongated armature shaft 35 to rotate within the housing 10 such that the wire windings 33 rotate through the magnetic field established between the permanent magnets 20. As best seen with simultaneous reference to both FIGS. 2 and 3, the three brushes 22, 24 and 26 are mounted on a brush card 28 in a conventional manner such that the end face of each of the brushes seats against a commutator 40 mounted on the armature shaft 35. Although the commutator 40 is illustrated in the drawings as a typical barrel-type commutator comprised of a plurality of axially-extending, circumferentially arrayed, closely-spaced commutator bars 42 providing a radially outboard commutation contact surface, it is to be understood that the commutator 40 could be of the disc type having an end face which provides a commutation contact surface. In operation, current is supplied to the wire windings 33 in a conventional manner through the commutator 40 by supplying current from a power source, e.g. the vehicle's electrical system, to one of either the low speed brush 22 or the high speed brush 24 and completing the current circuit through the common ground brush 26.

The low speed brush 22 and the common ground brush 26 are disposed in circumferentially spaced relationship substantially 180 degrees apart, that is diametrically spaced from each other on opposite sides of the commutator 40, and are positioned relative to the paired permanent magnets 20 so that contact between the end faces 23 and 27, of the low speed brush 22 and the common ground brush 26, respectively, and the commutator 40 occurs such that commutation with the armature windings takes place when the windings are passing through the neutral zone of the paired permanent magnets 20.

The high speed brush 24 is positioned in circumferentially spaced relationship with and between the low speed brush 22 and the common ground brush 26 and is offset from the low speed brush 22 by a preselected acute angle, for example about 60 degrees. However, as is well appreciated by those skilled in the art, the relative difference between the speed of rotation in revolutions per minute (RPM) of the motor at high speed as compared to low speed is determined by the magnitude of the angle of separation, X, between the low speed brush and the high speed brush, and thus the angle of separation selected is dependent upon the application of the motor and the high-low speed relationship desired. So positioned, however, the high speed brush 24 is located such that commutation with the armature winding occurs when the winding is passing outside of the neutral zone of the paired permanent magnets 20. Consequently, the high speed brush 24 is subjected to more severe erosion near the trailing region of its end face 27, which is the region of its end face at which the commutator 40 is passing out of contact with the end face, i.e. the downstream region of the end face with respect to rotation of the commutator, as compared to any erosion which may occur with respect to the brushes 22 and 26 disposed.

Figure 4:
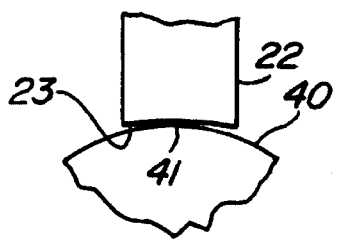
FIG. 4 is an enlarged side elevational view illustrating the conventional prior art configuration of the end faces of the diametrically opposed low speed and common ground brushes of the two-speed direct current motor of FIG. 3.
Figure 4:
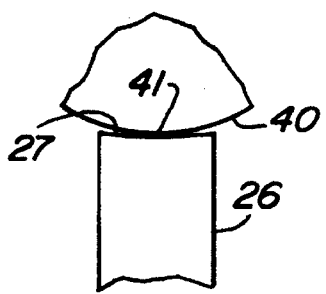

As the brushes 22 and 26 are located such that commutation with the armature windings occurs when the windings are passing through the neutral zone of the magnets 20 and therefore are not subjected to severe erosion, the end faces 23 and 27 of the brushes 22 and 26, respectively, are configured with a conventional arcuate surface. Typically, as illustrated in FIG. 4, that arcuate surface comprises an arc of a circle having a radius of curvature that is greater than the radius of the commutator 40 against which the end faces 23 and 27 of the brushes 22 and 26, respectively, seat. As a result, the brushes 22 and 26 disposed within the neutral zone of the paired permanent magnets 20 contact the surface of the commutator 40 along a line of contact 41 extending axially across the depth of the larger radius arcuate end faces 23 and 27, respectively, along the mid-width line in the central region thereof.

Figure 5:
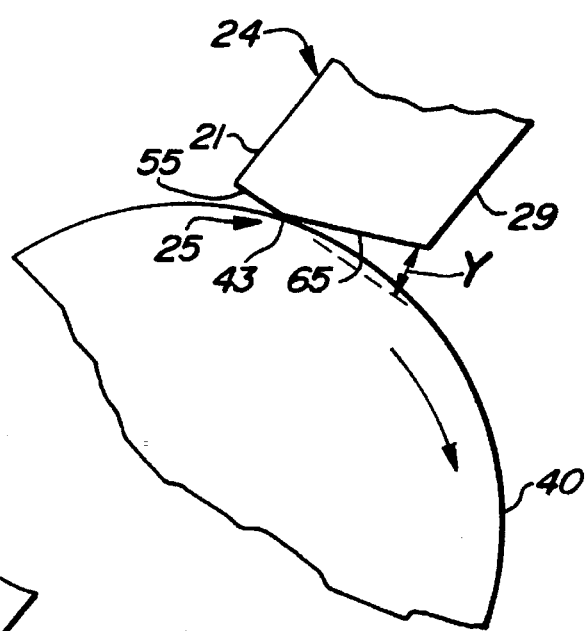
FIG. 5 is an enlarged side elevational view illustrating the surface of the end face of the high speed brush of the two-speed direct current motor of FIG. 3 configured in accordance with a preferred embodiment of the present invention.
Figure 6:
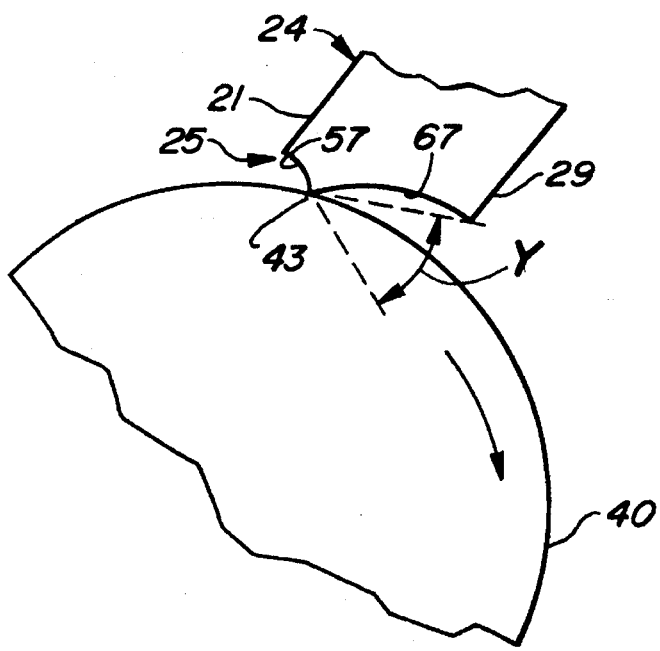
FIG. 6 is an enlarged side elevational view illustrating the surface of the end face of the high speed brush of the two-speed direct current motor of FIG. 3 configured in accordance with an alternate embodiment of the present invention.

Referring now to FIGS. 5 and 6, the end face 25 of the brush 24 located intermediate the diametrically opposed brushes 22 and 26, which is located such that commutation of the armature windings occurs as the windings pass outside of the neutral region of the magnet poles and in the illustrated embodiment of the motor 120 comprises the high speed brush, is non-arcuate in contour and is formed by a first surface 55, 57 and a second surface 65, 67 which are offset from each other by an acute angle, Y, which is advantageously less than about 25 degrees, and intersect to provide an axially extending line of contact 43 with the commutator 40 which is not located in the central region of the end face 25, but rather is displaced from the central region thereof by a desired circumferential spacing toward the leading edge 21 of the end face 25 and away from the trailing edge 29 of the end face 25 of the brush 24. The first and second surfaces 55, 57 and 65, 67, respectively, may comprise flat planar surfaces or arcuate surfaces. Ideally, the line of contact 43 should be as close as possible to the leading edge 21 of the brush 24 without creating a condition where the leading edge of the brush would drop into the slots between the commuter bars. In this manner, the end face 25 of the brush 24 is initially configured to simulate the end face of a conventional arcuate brush that has been subjected to erosion for a sufficient period of operation to have become fully seated. Therefore the line of contact 43 between the commutator and the brush 24, having a non-arcuate end face 25 configured in accordance with the present invention, will not shift position, but rather will remain substantially as positioned upon installation. Consequently, the speed of the motor 120 equipped with the brush 24 configured in accordance with the present invention will not advance as the motor breaks in, but rather will remain at substantially the same RPM as associated with high speed operation upon initial operation.

In a preferred embodiment of the present invention illustrated in FIG. 5, the end face 25 of the brush 24 has a first flat planar surface 55 and a second flat planar surface 65, which flat planar surfaces intersect at a line of intersection forming the line of contact 43 with the commutator 40. The first flat planar surface 55 extends inwardly from the leading edge 21 of the brush 24, and most advantageously perpendicularly with the leading edge 21, that is the upstream edge of the brush with respect to the rotation of the commutator 40, to the line of intersection 43 and the second flat planar surface 65 extends inwardly from the trailing edge 29 of the brush 24, that is the downstream edge thereof with respect to the rotation of the commutator 40, to the line of intersection 43. The second planar surface 65 is, however, offset from the first planar surface 55 by an acute angle, Y. The magnitude of the offset angle, Y, will vary from motor to motor according to the diameter of the commutator 40 upon which the brush 24 seats.

In a specific embodiment of the present invention comprising a fractional-horsepower, two pole, three brush, two-speed direct current motor particularly suited for use as a drive motor for an automobile windshield wiper system and incorporating a brush configuration as illustrated in FIG. 5, the motor has a commutator having a diameter of approximately 0.860 inches, the two diametrically opposed brushes comprise a low speed brush and a common ground brush, respectively, located to commutate the armature windings when the windings are passing within the neutral zone of the magnet poles, and the high speed brush is positioned intermediate the low speed and common terminal brushes. So located, commutation of the armature windings occurs at the high speed brush when the windings are passing outside of the neutral zone of the magnet poles. The first and second planar surfaces of the high speed brush comprise flat planar surfaces which intersect at an offset angle ranging from 10 to 15 degrees, and optimally at an angle of about 13 degrees, and at a line of contact lying about 0.025 inches inward from the leading edge of the brush which has a width of about 0.203 inches. For this specific embodiment, allowing for manufacturing tolerances, locating the line of contact formed by the intersecting planes at a distance of 25 thousandths of an inch inward from the leading edge of the high speed brush was found to be adequate for ensuring that the slots between the bars of the rotating commutator pass smoothly under the brush without the leading edge thereof dropping into the slots, while at the same time providing a configuration which is readily achievable from a manufacturing standpoint.

In an alternate embodiment of the present invention illustrated in FIG. 6, the end face 25 of the brush 24 has a first contoured surface 57 and a second contoured surface 67, which comprise arcuate surfaces intersecting at a line of intersection forming the line of contact 43 with the commutator. The first arcuate surface 57 extends from the leading edge 21 of the brush 24 inwardly to the line of intersection 43, while the second arcuate surface 67 extends inwardly from the trailing edge 29 of the brush 24 to the line of intersection 43. As with respect to flat planar surfaces, the second arcuate surface 67 is offset from the first arcuate surface 57 by an acute angle, Y, and the magnitude of this offset angle again depends upon the commutator diameter.

It is to be understood that the end face 25 of the intermediate brush 24 may be configured with intersecting surfaces both of which are neither flat planar surfaces nor arcuate surfaces without departing from the spirit and scope of the present invention. For example, the end face 25 of the brush 24 illustrated in FIG. 5 could be modified to comprise one flat planar surface and one arcuate surface, with either the leading surface 55 being flat or arcuate and the trailing surface 65 being, conversely, arcuate or flat. Further, when one or both of the intersecting surfaces is an arcuate surface, that arcuate surface may be concave inwardly, as illustrated in FIG. 6, or conversely convex outwardly, or, in the case of an end face having two intersecting arcuate surfaces, one could be convex and the other concave without departing from the spirit and scope of the present invention.

Figure 7:
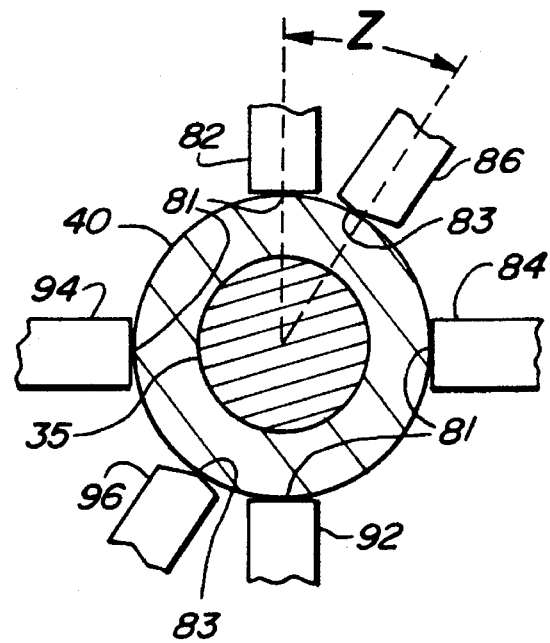
FIG. 7 is an enlarged side elevational view illustrating the surface of the end face of the high speed brush of a four pole, six brush, multi-speed direct current motor configured in accordance with an alternate embodiment of the present invention.

The present invention also has application to multiple speed four pole motors, such as illustrated in FIG. 7, wherein six brushes are provided to commutate the armature windings. In a four pole motor, four magnet poles are provided at equally spaced intervals circumferentially around the interior of the motor housing. The magnet poles may comprise permanent magnets or wound electromagnets. An armature comprised of a plurality of wire windings is supported on an axially elongated armature shaft to rotate within the motor housing such that the wire windings pass through the magnet field established between the magnet poles.

The six brushes 82, 84, 86, 92, 94 and 96 are mounted in a conventional manner on a brush card such that the end face of each of the brushes seats against a commutator 40 mounted on the armature shaft 35. As in conventional practice, two brushes 82 and 92 comprise low speed brushes, two brushes 84 and 94 comprise common ground brushes, and two brushes 86 and 96 comprise high speed brushes. The two common ground brushes 84 and 94 are wired in parallel and disposed in circumferentially spaced relationship substantially 180 degrees apart, that is diametrically spaced from each other on opposite sides of the commutator 40. The two low speed brushes 82 and 92 are wired in parallel and also disposed in circumferentially spaced relationship substantially 180 degrees apart, that is diametrically spaced from each other on opposite sides of the commutator 40, but are disposed in circumferentially spaced relationship with the common ground brushes 84 and 94 at a spacing of substantially 90 degrees. The low speed brushes 82 and 92 and the common ground brushes 84 and 94 are positioned relative to the four magnet poles such that commutation of the armature windings occurs as the windings pass through the neutral zones of the magnetic fields established by the four magnet poles.

The two high speed brushes 86 and 96 are wired in parallel and disposed in circumferentially spaced relationship substantially 180 degrees apart, that is diametrically spaced from each other on opposite sides of the commutator 40, and are also disposed in circumferentially spaced relationship with and between the low speed brushes 82 and 92 and the common ground brushes 84 and 94, respectively. High speed brush 86 is offset from low speed brush 82 and high speed brush 96 is offset from low speed brush 92 by an acute angle of separation, Z, for example about 30 degrees. However, as is well appreciated by those skilled in the art, the relative difference between the speed of rotation in revolutions per minute (RPM) of the motor at high speed as compared to low speed is determined by the magnitude of the angle of separation, Z, between the low speed brushes and the high speed brushes, and thus the angle of separation selected is dependent upon the application of the motor and the high-low speed relationship desired.

So positioned, however, the high speed brushes 86 and 96 are located such that commutation of the armature windings occurs as the windings are passing outside the neutral zone of the four pole magnets. Consequently, the high speed brushes are subjected to more severe erosion near the trailing region of their respective end faces, as compared to any erosions which may occur with respect to the brushes 82, 84, 92 and 94. Therefore, each of the high speed brushes 86 and 96 of the four pole motor is configured, in accordance with the teachings of the present invention, with a non-arcuate end face formed by first and second intersecting surfaces which are offset from each other by an angle, Y, so as to intersect to form a line of contact 83 with the commutator 40 which is not located in the central region of the end face, but rather is displaced from the central region thereof by a desired circumferential spacing toward the leading edge of the end face. As noted with respect to the two-pole motor configuration, the first and second planar surfaces may be either flat planar surfaces or arcuate planar surfaces and, if arcuate, may be convex or concave.

We claim:

1. A multi-speed direct current electric motor comprising:

at least two magnet poles disposed within a motor housing in cooperative relationship for establishing a magnetic field;

a rotor assembly having an armature winding disposed about an axially elongated armature shaft for rotation within the magnetic field established by said magnet poles and a commutator mounted on said armature shaft and electrically connected to said armature winding, said commutator providing a commutation contact surface;

a low speed brush disposed in interfacing relationship with said rotor assembly and having an end face interfacing with the commutation contact surface of said commutator;

a common ground brush disposed in interfacing relationship with said rotor assembly and having an end face interfacing with the commutation contact surface of said commutator, said low speed brush and said common ground brush operatively associated to cause the motor to rotate at a first relatively low speed when an electrical current is supplied to said low speed brush; and a high speed brush disposed in interfacing relationship with said rotor assembly and in spaced relationship with and between said low speed brush and said common ground brush, said high speed brush and said common ground brush operatively associated to cause the motor to rotate at a second relatively high speed when an electrical current is supplied to said high speed brush, said high speed brush having an end face interfacing with the commutation contact surface of said commutator, the end face of said high speed brush having a first surface and a second surface intersecting at a line of intersection for contacting the commutation contact surface of said commutator, said line of intersection being displaced away from a central region of the end face of said high speed brush.

2. A multi-speed direct current electric motor as recited in claim wherein said first and second surfaces each comprise flat planar surfaces.

3. A multi-speed direct current electric motor as recited in claim 2 wherein said first and second flat planar surfaces are offset from each other at an acute angle of less than about 25 degrees.

4. A multi-speed direct current electric motor as recited in claim 3 wherein said first and second surfaces are offset from each other at an acute angle ranging from 10 to 15 degrees.

5. A multi-speed direct current electric motor as recited in claim 1 wherein said first and second surfaces each comprise arcuate surfaces.

6. A multi-speed direct current electric motor as recited in claim 5 wherein said first and second arcuate surfaces are offset from each other at an acute angle of less than about 25 degrees.

7. A multi-speed direct current electric motor as recited in claim 6 wherein said first and second surfaces are offset from each other at an acute angle ranging from 10 to 15 degrees.

8. A multi-speed direct current electric motor as recited in claim 1 wherein at least one of said first and second surfaces comprises a flat planar surface.

9. A multi-speed direct current electric motor as recited in claim 1 wherein at least one of said first and second surfaces comprises an arcuate surface.

10. A multi-speed direct current electric motor as recited in claim 9 wherein said first and second surfaces are offset from each other at an acute angle of less than about 25 degrees.

11. A multi-speed direct current electric motor as recited in claim 10 wherein said first and second surfaces are offset from each other at an angle ranging from 10 to 15 degrees.

12. A multi-speed, four pole, six brush, direct current electric motor comprising:

four magnet poles disposed within a motor housing in cooperative relationship for establishing a magnetic field;

a rotor assembly having an armature winding disposed about an axially elongated armature shaft for rotation within the magnetic field established by said magnet poles and a commutator mounted on said armature shaft and electrically connected to said armature winding, said commutator providing a commutation contact surface;

a pair of low speed brushes wired in parallel and disposed in interfacing relationship with said rotor assembly in diametrically opposed relationship on opposite sides of said rotor assembly, each of the low speed brushes having an end face interfacing with the commutation contact surface of said commutator;

a pair of common ground brushes wired in parallel and disposed in interfacing relationship with said rotor assembly in diametrically opposed relationship on opposite sides of said rotor assembly, the pair of common ground brushes circumferentially spaced 90 degrees from the pair of low speed brushes, each of the common ground brushes having an end face interfacing with the commutation contact surface of said commutator, each of the low speed brushes being operatively associated with a respective one of the common ground brushes to cause the motor to rotate at a first relatively low speed when an electrical current is supplied to the low speed brushes; and a pair of high speed brushes wired in parallel and disposed in interfacing relationship with said rotor assembly in diametrically opposed relationship on opposite sides of said rotor assembly, the pair of high speed brushes being disposed between the pair of low speed brushes and the pair of high speed brushes whereby each of the high speed brushes is circumferentially spaced by an acute angle from a respective one of the low speed brushes, each of the high speed brushes being operatively associated with a respective one of the common ground brushes to cause the motor to rotate at a second relatively high speed when an electrical current is supplied to the high speed brushes, each of said high speed brushes having an end face interfacing with the commutation contact surface of said commutator, the end face of each high speed brush having a first surface and a second surface intersecting at a line of intersection for contacting the commutation contact surface of said commutator, said line of intersection being displaced away from a central region of the end face of each high speed brush.

13. A multi-speed, four pole, six brush, direct current electric motor as recited in claim 12 wherein said first and second surfaces each comprise flat planar surfaces.

14. A multi-speed, four pole, six brush direct current electric motor as recited in claim 13 wherein said first and second surfaces are offset from each other at an acute angle less than about 25 degrees.

15. A multi-speed, four pole, six brush, direct current electric motor as recited in claim 14 wherein said first and second flat planar surfaces are offset from each other at an angle ranging from 10 to 15 degrees.

16. A multi-speed, four pole, six brush direct current electric motor as recited in claim 12 wherein said first and second surfaces each comprise arcuate surfaces.

17. A multi-speed, four pole, six brush direct current electric motor as recited in claim 16 wherein said first and second arcuate surfaces are offset from each other at an acute angle less than about 25 degrees.

18. A multi-speed, four pole, six brush, direct current electric motor as recited in claim 17 wherein said first and second arcuate surfaces are offset from each other at an angle ranging from 10 to 15 degrees.

19. A multi-speed, four pole, six brush direct current electric motor as recited in claim 12 wherein at least one of said first and second surfaces comprises a flat planar surface.

20. A multi-speed, four pole, six brush direct current electric motor as recited in claim 12 wherein at least one of said first and second surfaces comprises an arcuate surface.

21. A multi-speed, four pole, six brush direct current electric motor as recited in claim 12 wherein said first and second surfaces are offset from each other at an acute angle of less than about 25 degrees.

22. A two-speed direct current electric motor comprising:

a pair of permanent magnet poles disposed within a motor housing in Cooperative relationship for establishing a magnetic field;

a rotor assembly having an armature winding disposed about an axially elongated armature shaft for rotation within the magnetic field established by said magnet poles and a commutator mounted on said armature shaft and electrically connected to said armature winding, said commutator providing a commutation contact surface;

a low speed brush disposed in interfacing relationship with said rotor assembly and having an end face interfacing with the commutation contact surface of said commutator;

a common ground brush disposed in interfacing relationship with said motor assembly and having an end face interfacing with the commutation contact surface of said commutator, said low speed brush and said common ground brush operatively associated to cause the motor to rotate at a first relatively low speed when an electrical current is supplied to said low speed brush; and a high speed brush disposed in interfacing relationship with said rotor assembly and in spaced relationship with and between said low speed brush and said common ground brush, said high speed brush and said common ground brush operatively associated to cause the motor to rotate at a second relatively high speed when an electrical current is supplied to said high speed brush, said high speed brush having an end face interfacing with the commutation contact surface of said commutator, the end face of said high speed brush having a first surface and a second surface intersecting at a line of intersection for contacting the commutation contact surface of said commutator, said line of intersection being displaced away from a central region of the end face of said high speed brush.

23. A two-speed direct current electric motor as recited in claim 22 wherein said first and second surfaces each comprise flat planar surfaces.

24. A two-speed direct current electric motor as recited in claim 23 wherein said first and second flat planar surfaces are offset from each other at an acute angle of less than 25 degrees.

25. A two-speed direct current electric motor as recited in claim 24 wherein said first and second flat planar surfaces are offset from each other at an angle ranging from 10 to 15 degrees.

26. A two-speed direct current electric motor as recited in claim 22 wherein said first and second surfaces each comprise arcuate surfaces.

27. A two-speed direct current electric motor as recited in claim 26 wherein said first and second arcuate surfaces are offset from each other at an angle of less than about 25 degrees.

28. A two-speed direct current electric motor as recited in claim 27 wherein said first and second arcuate surfaces are offset from each other at an angle ranging from 10 to 15 degrees.

29. A two-speed direct current electric motor as recited in claim 22 wherein at least one of said first and second surfaces comprises a flat planar surface.

30. A two-speed direct current electric motor as recited in claim 22 wherein at least one of said first and second surfaces comprises an arcuate surface.

31. A two-speed direct current electric motor as recited in claim 22 wherein said first and second surfaces are offset from each other at an angle of less than about 25 degrees.

32. A two-speed direct current electric motor as recited in claim 31 wherein said first and second surfaces are offset from each other at an angle ranging from 10 to 15 degrees.

* * * * *

UNITED STATES PATENT AND TRADEMARK OFFICE
CERTIFICATE OF CORRECTION

PATENT NO. : 5,485,049
DATED : Jan. 16, 1996
INVENTOR(S) : Larry S. Shannon et al.

It is certified that error appears in the above-indentified patent and that said Letters Patent is hereby corrected as shown below:

Column 8, line 32: between "claim" and "wherein" insert --1--.

Column 10, line 15: "Cooperative" should be --cooperative--.

Column 10, line 30: "said motor assembly" should be --said rotor assembly--.

Signed and Sealed this

Sixteenth Day of April, 1996

Attest:

BRUCE LEHMAN

Attesting Officer    Commissioner of Patents and Trademarks